United States Patent [19]

Marcatili

[11] 4,251,130
[45] Feb. 17, 1981

[54] VELOCITY MATCHED OPTICAL GATE

[75] Inventor: Enrique A. J. Marcatili, Rumson, N.J.

[73] Assignee: Bell Telephone Laboratories, Incorporated, Murray Hill, N.J.

[21] Appl. No.: 58,744

[22] Filed: Jul. 18, 1979

[51] Int. Cl.³ .................. G02B 21/14; G02F 1/01
[52] U.S. Cl. .................. 350/96.14; 350/355
[58] Field of Search .................. 350/96.13, 96.14, 355

[56] References Cited

U.S. PATENT DOCUMENTS

| | | | |
|---|---|---|---|
| 3,695,745 | 10/1972 | Furukawa | 350/96.14 |
| 4,005,927 | 2/1977 | Caton | 350/96.14 |

OTHER PUBLICATIONS

"Ga As Rib-Waveguide Directional Coupler Switch with Schottky Barriers", Kawaguchi, Electronics Letters, pp. 337–338, Jun. 1978.

*Primary Examiner*—John K. Corbin
*Assistant Examiner*—Rodney B. Bovernick
*Attorney, Agent, or Firm*—Sylvan Sherman

[57] ABSTRACT

The coupling between a pair of coupled wavepaths (11, 12) is modulated by means of a biasing wave travelling in synchronism with the signal in the coupled wavepaths. In particular, by limiting the coupling to a small interval about the zero crossover point of the biasing signal, subpicosecond pulses can be generated by means of a simple sine wave biasing signal. Such a velocity matched gate can be employed as a pulse generator; a modulator; a multiplexer/demultiplexer; and pulse shape analyzer.

15 Claims, 26 Drawing Figures

VELOCITY MATCHED OPTICAL GATE

TECHNICAL FIELD

This application relates to a subpicosecond optical gate and its use as a pulse generator, modulator, pulse shape analyzer, multiplexer and demultiplexer.

BACKGROUND OF THE INVENTION

As the problems relating to the design and fabrication of broadband optical fibers are being successfully resolved, attention is now shifting to the investigation of methods for exploiting their great potential. This involves the ability to modulate a property of optical waves with an information signal. The wave property can be its intensity, phase, frequency, or polarization. While both analog and digital formats are suitable for modulating the optical carrier in a fiber system, digital modulation provides some noise immunity and is ideally suited to fiber transmission where the available bandwidth is large.

Intensity modulation is relatively simple to implement with presently available optical sources such as electroluminescent light-emitting diodes (LEDs) and injection lasers. These sources can be modulated directly by varying their driving currents at rates up to a few gigahertz. Pulse widths in the nanosecond range are realized by this technique. Other optical sources, such as the neodymium laser, that cannot be directly modulated at high frequencies require separate, external modulators. One such device, illustrated in U.S. Pat. No. 4,005,927, comprises an optical carrier waveguide and an electrical waveguide for an electrical drive signal. The parameters of the two waveguiding structures are chosen such that the phase velocities of the optical energy and the electrical drive signal are approximately equal. While this structure phase modulates the optical signal, it can be implemented as an amplitude modulator by the addition of appropriate external polarizers.

Also disclosed in the above-identified patent is an optical switch comprising an optical directional coupler and a travelling wave electrical drive circuit. In operation, the interaction of the electrical drive signal and the optical signal causes the optical signal in one of the optical waveguides to be transferred over into the other optical waveguide.

As perceived by the patentee, one advantage of the above-described structures resides in their increased efficiency over a much greater drive signal bandwidth. Thus, it would appear that quasi-linear operation is contemplated in which the bandwidth of the drive signal is quite similar to the bandwidth of the modulation impressed upon the optical signal. Such an arrangement, however, places a severe strain upon the drive signal circuit and drive source particularly if one wishes to generate very narrow optical pulses. With today's technology, generators using the best semiconductor devices are capable of generating 10 to 100 picosecond pulses. Thus, this prior art technique cannot be used at present to generate subpicosecond pulses.

SUMMARY OF THE INVENTION

The present invention is based upon the discovery that very short optical pulses requiring a very broad band can be generated by means of very narrow band modulating signals. Unlike the prior art, a train of very narrow optical pulses, subpicosecond wide, can be generated in the limit, by means of a modulating signal consisting of a sine wave. This is accomplished in accordance with the present invention by controlling the coupling characteristic along an optical directional coupler by means of a narrow band bias signal that travels in synchronism with the optical signal. More specifically, the coupler parameters are such that substantial optical coupling occurs only in the region about the zero points of the travelling bias signal.

A velocity-matched directional coupler or gate (VMG) of this type can open and close in less than one-tenth of a picosecond and can be used to either generate, modulate, time-multiplex or demultiplex subpicosecond pulses of any optical wavelength. Such a device is a most promising tool for extending present-day frontiers in the fields of optical communications, time domain spectroscopy, metrology, computer logic and any other area of activity where extremely short pulses are useful.

BRIEF DESCRIPTION OF THE DRAWING

FIGS. 13, 14, 15 and 16 show the bias signal, the two input pulse trains and the resulting multiplexed optical output signal when using a VMG as a multiplexer;

DETAILED DESCRIPTION

Figures 1, 2:
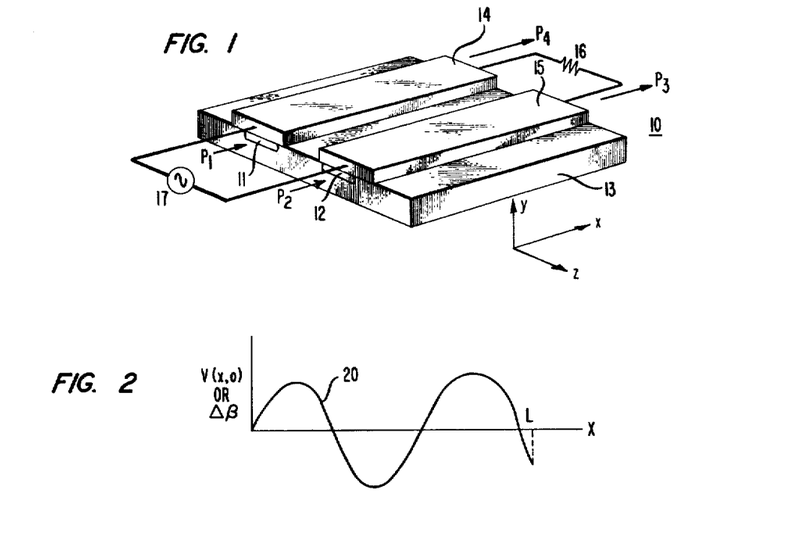
FIG. 1 shows a velocity matched gate (VMG) in accordance with the invention.
FIGS. 2 and 3 represent the instantaneous bias voltage along the biasing electrodes of the VMG of FIG. 1, or the equivalent $\Delta\beta$, at two different instants, 0 and $t_o$.

Referring to the drawings, FIG. 1 shows a velocity matched gate (VMG) comprising an optical directional coupler 10 including a pair of substantially identical dielectric waveguides 11 and 12 embedded in an electrooptic substrate 13 of lower refractive index. The guides are in coupling relationship over a length L, where the coupling coefficient per unit length, c, and the coupling interval L are related by $$cL \approx (\pi/2) \tag{1}$$

Modulating means for varying the coupling between the guides comprises a pair of parallel electrodes 14 and 15 located in the illustrative embodiment directly over the optical waveguides 11 and 12, respectively. As is evident, however, other electrode configurations for modulating the coupling coefficient can be employed.

The electrodes form an electrical transmission line that is terminated at its output end by its characteristic impedance 16, and is energized at its input end by a signal source 17. The latter provides a travelling bias voltage which propagates along the electrodes and terminates in the matching impedance 16.

In the absence of a biasing signal from generator 17, an optical signal $P_1$ applied to one end of waveguide 11 will be transferred to the other guide 12. If, however, an electric field is applied between the electrodes, the propagation constants $\beta_1$ and $\beta_2$ of the waveguides are locally perturbed due to the electrooptic effect. Thus, at any point x along the coupler, the propagation constants will vary as a function of time t. Assuming a sinusoidal biasing voltage of maximum amplitude $V_o$ and period T, the biasing voltage and the difference in propagation constants are given by $$V(x, t) = V_o \sin \frac{2\pi}{T} \left[ \frac{x}{v} - t \right], \tag{2}$$

and $$\beta_1 - \beta_2 = \frac{4\pi}{\lambda} \Delta n \sin \frac{2\pi}{T} \left[ \frac{x}{v} - t \right], \tag{3}$$

where
$\lambda$ is the freespace wavelength of the optical signal;
$v$ is the phase velocity of the bias signal;
and
$\Delta n$ is the maximum index change induced in each of the guides by the biasing field.

The index change, $\Delta n$, is proportional to $V_o$, to the relevant electrooptic coefficient of the substrate, and to a constant that takes into consideration the nonuniformity of the biasing field across the guides. Second order changes in the coupling due to any changes in the optical field configuration have been neglected.

The perturbation in the refractive index propagates along the waveguides along with the optical wave. By the appropriate choice of materials and configurations, the group velocity of the optical wave in the unbiased guides and the phase velocity of the biasing wave can be made equal. When this is done, the device is a velocity matched directional coupler such that light entering one of the guides at time t sees a uniform coupler with constant coupling coefficient, c, and constant propagation constant difference $$\Delta \beta = \frac{4\pi}{\lambda} \Delta n \sin \left[ \frac{2\pi t}{T} \right] \tag{4}$$

Figure 3:
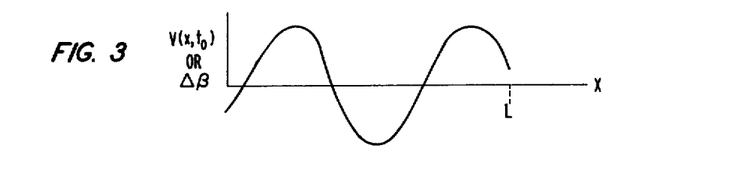

Thus, only light entering at instants t which are integral multiples of T/2 (i.e., for which $\Delta \beta = 0$) will be completely transferred to the other guide. At all other instants, $\Delta \beta$ will have some finite value such that there will be less than complete transfer of the incident light. Accordingly, a velocity matched directional coupler can be used as an intensity modulator. In particular, if $\Delta \beta$ at all times remains much smaller than c, linear modulation can be realized. In such an arrangement, the biasing signal is impressed directly upon the optical wave as an amplitude modulation. If, however, the bias signal is sufficiently large so that $\Delta \beta$ is much larger than c, as in accordance with the present invention, nonlinear operation is obtained. For example, let curve 20 in FIG. 2 represent the instantaneous bias voltage along the biasing electrodes, or its equivalent $\Delta \beta$, at a particular time t=0. Photons entering guide 11 at this instant see zero biasing voltage and, consequently, the guides have the same propagation constants (i.e., $\Delta \beta = 0$). As time goes by, these photons and the zero bias region travel along the coupler at the same speed, resulting in the full transfer of photons to the other guide 12. By contrast, photons entering guide 11 at a later time, $t = t_o$, when the biasing voltage at x=0 is not zero, see a $\Delta \beta$ that is also not zero, as illustrated in FIG. 3. These photons also travel in synchronism with the bias signal and, hence, the transfer of power is less than total, resulting in a smaller output signal.

Assuming no attenuation in the device, no frequency sensitivity associated with the coupling coefficient, no dispersion in the guides, and one unit of input power (i.e., $P_1 = 1$), the power transferred to guide 12 for a sine wave bias signal is given by $$P_3 = \frac{1}{(\frac{4L\Delta n}{\lambda} \sin \frac{2\pi t}{T})^2} \sin^2 \frac{\pi}{2} \sqrt{1 + (\frac{4L\Delta n}{\lambda} \sin \frac{2\pi t}{T})^2} \tag{5}$$

where $\Delta n$ is the charge in refractive index induced by the bias voltage.

Figure 4:
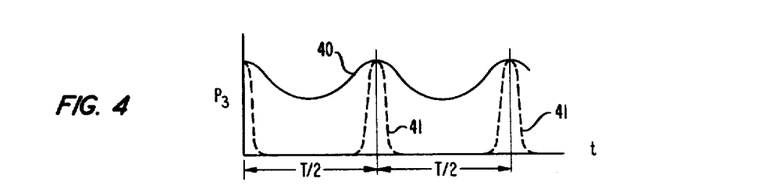
FIG. 4 shows the shape of the coupled optical power for different amplitude biasing signals.
Figure 5:
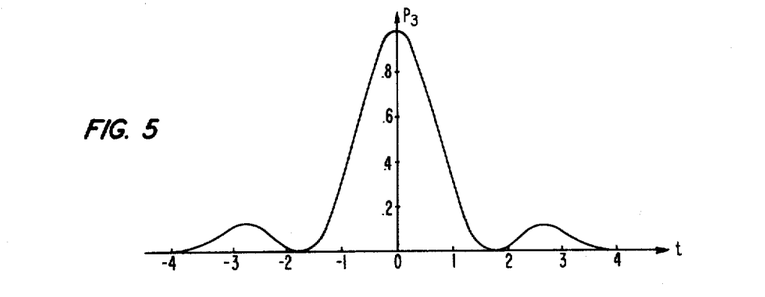
FIG. 5 shows the detailed shape of each optical pulse for large biasing signals.
Figure 6:
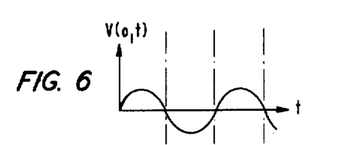
FIGS. 6, 7, 8 and 9 show the time dependence of the biasing signal at $x=0$; the input optical signal and the output optical signals for a VMG operating in accordance with the invention.
Figure 7:
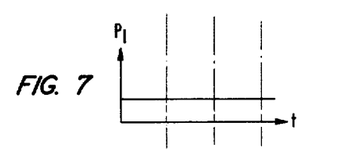
Figure 8:
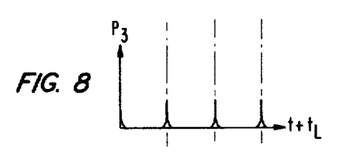

For small values of $\Delta n$, the coupled power $P_3$, as shown by curve 40 in FIG. 4, is a periodic sequence of maxima and minima, spaced apart T/2, where T is the period of the sine wave bias signal. If, however, $\Delta n$ is sufficiently large so that $$(4L\Delta n/\lambda) >> 1, \tag{6}$$

the shape of the coupled power curve reduces to a sequence of pulses that are short compared to T/2, as illustrated by curve 41 in FIG. 4. The detailed shape of each pulse is shown in FIG. 5, which is a plot of $$P_3 = \frac{1}{1 + \left[\frac{8\pi \Delta n L t}{\lambda T}\right]^2} \sin^2 \frac{\pi}{2} \sqrt{1 + \left[\frac{8\pi \Delta n L t}{\lambda T}\right]^2} \tag{7}$$

and is valid for the region about each peak (i.e., $(2\pi t/T) << 1$).

The half-power width of the pulse is $$\tau = (0.8\lambda T/4\pi \Delta n L) \tag{8}$$

As can be seen from equation (8), narrow pulses are obtained by using a high frequency biasing signal (small T); a long coupler length (large L); a large biasing signal and a substrate with a large electroptic coefficient (large $\Delta n$). Without straining present day technology, the following parameters are readily realizable:

$\lambda = 1$ μm
$L = 10$ cm
$T = 10^{-10}$ sec
and
$\Delta n = 10^{-3}$ for a $LiNbO_3$ substrate operating with a $10^5$ v/cm maximum field.

Substituting these numbers in equation (8) one obtains a pulse width $\tau = 0.063$ psec. which is orders of magnitude smaller than pulse widths that can be generated employing current state of the art techniques.

Referring now to FIGS. 6, 7, 8 and 9, the time dependence of the biasing voltage at $x=0$; of the optical power $P_1$ entering guide 11; and of the optical power $P_3$ and $P_4$ leaving guides 11 and 12, respectively, are shown. The transit time through the coupler is given as $t_L$. It will be noted that a pulse of output power is developed in guide 12 for every zero crossing of the bias voltage. A corresponding notch is produced in the output signal from guide 11.

While the operation of the velocity matched gate has been described with respect to a sine wave bias signal, more generally, other voltage shapes can be advantageously employed for narrowing the output optical pulses even further. Basically, this is achieved by increasing the slope of the biasing signal in the zero crossover region. In the case of a simple sine wave, the slope is increased by increasing the amplitude of the signal. This approach, however, is limited by the breakdown voltage of the dielectric substrate material. Accordingly, some sort of voltage limiting is advantageously employed such that the biasing voltage is a clipped sine wave.

Having described the operation of the velocity matched gate, a number of unique applications will now be described.

Pulse Modulator

Figure 10:
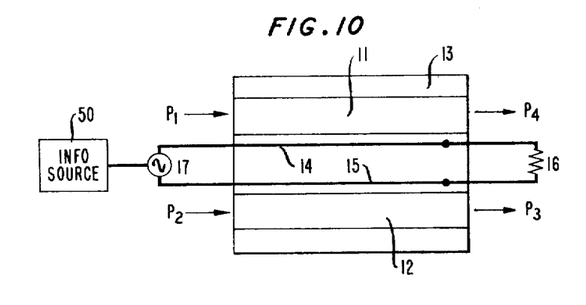
FIG. 10 shows the use of a VMG as a pulse modulator.
Figure 11:
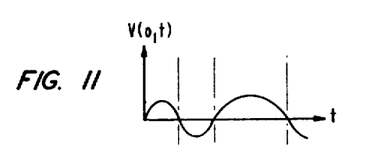
FIGS. 11 and 12 show a frequency modulated biasing signal and the resulting pulse position modulation produced in the output optical signal.
Figure 12:
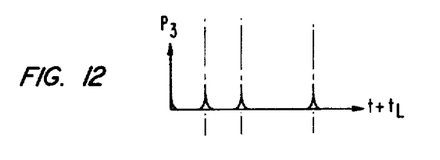

The VMG of FIG. 1 can be employed as a pulse modulator by the appropriate control of the bias signal, as illustrated in FIG. 10. Using the same identification numerals as in FIG. 1, the gate is represented in planar view by the guides 11, 12; substrate 13; electrodes 14 and 15; and termination 16. In this arrangement, the bias source 17, connected between electrodes 14 and 15, is modulated by means of an information signal source 50. If, for example, the information source frequency modulates bias source 17, the interval between zero crossings will change thereby pulse position modulating the output optical pulses. This is illustrated in FIGS. 11 and 12 which shows a frequency modulated bias signal and the resulting ppm optical signal. Alternatively, the magnitude of the biasing signal can be modulated by the information signal in which case the slope of the bias signal will vary and, in turn, the optical pulses will be pulse width modulated.

Multiplexer & Demultiplexer

Figure 13:
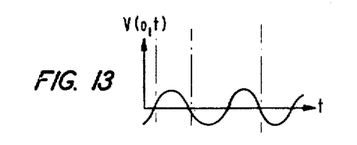
Figure 14:
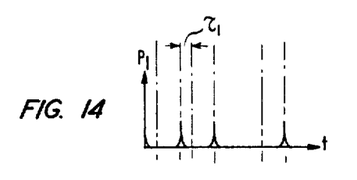

In the discussion hereinabove, the input optical signal $P_1$ was a cw signal and the resulting output signal a train of optical pulses. Having generated two such trains of pulses, a VMG can then be used to multiplex the two pulse trains. In such an arrangement, one pulse train, $P_1$, is applied to guide 11 in FIG. 1 and the other, $P_2$, to guide 12. The two pulse trains are displaced by time $\tau$, as indicated in FIGS. 14 and 15. Multiplexing is achieved by means of a bias signal whose zero crossover points correspond in time with the time slots of one of the signals $P_2$, as illustrated in FIG. 13. The effect is to couple the pulses associated with pulse train $P_2$ from guide 12 to guide 11. Because the pulses in guide 11 are in synchronism with that portion of the bias wave for which the bias voltage is different than zero, these pulses "see" a large mismatch and, consequently, remain in guide 11. The output $P_4$ from guide 11 thus includes the two input pulse trains again displaced by $\tau$, as illustrated in FIG. 16.

Figure 17:
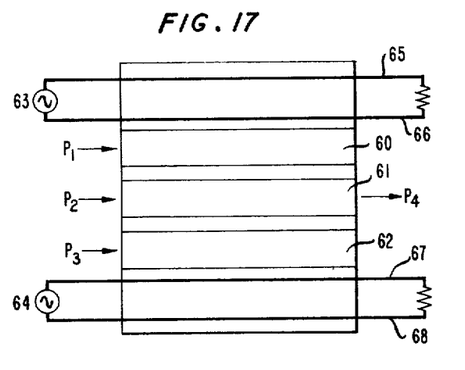
FIG. 17 shows a modified VMG having three optical guides and two biasing circuits for multiplexing three optical pulse trains.

This technique can be extended to include a third pulse train by the addition of a third optical guide, as illustrated in FIG. 17. In this embodiment, three pulse trains $P_1$, $P_2$ and $P_3$ are applied, respectively, to the three optical guides 60, 61 and 62. Each pulse train occupies a separate set of time slots that are displaced relative to the time slots occupied by the other pulse trains.

A first bias voltage source 63, coupled to a first set of electrodes 65-66 disposed adjacent to guide 60, provides a bias voltage that modifies the index of guide 60 and has zero crossover points that are in time coincidence with the time slots occupied by pulse train $P_1$. The effect of this is to couple pulse train $P_1$ into guide 61. Similarly, a second bias voltage source 64, coupled to a second set of electrodes 67-68 disposed adjacent to guide 62, provides a bias voltage that modifies the index of guide 62 and has zero crossover points that are in time coincidence with the time slots occupied by pulse train $P_3$. The effect of this is to couple pulse train $P_3$ into guide 61. The resulting output is a pulse train $P_4$ which includes all three pulse trains $P_1$, $P_2$ and $P_3$.

Demultiplexing is simply the reverse process. For example, in FIG. 17, if pulse train $P_4$ is coupled into guide 61, bias signal sources 63 and 64 will selectively couple pulse train $P_1$ and $P_3$ from guide 61 into guides 60 and 62, respectively.

Pulse Shape Analyzer

Figure 18:
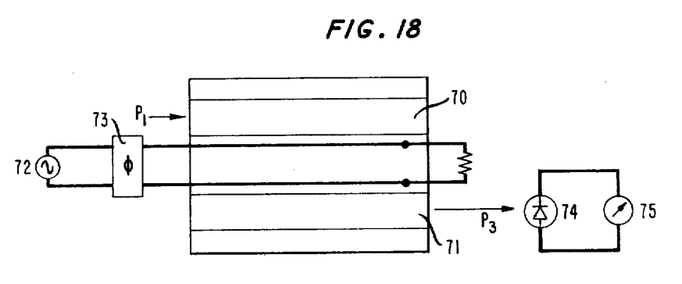
FIG. 18 shows a VMG used as a pulse analyzer.
Figure 19:
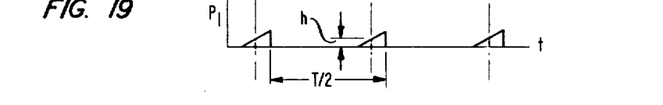
FIGS. 19, 20 and 21 show the pulses to be analyzed, the biasing signal, and the output signal from the analyzer.
Figure 20:
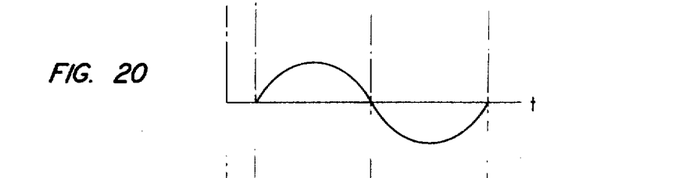

A velocity matched gate can be used to analyze complex wave shapes because of the extremely short time during which it remains open. Assume a periodic sequence of optical pulses $P_1$, of period $T/2$, as illustrated in FIG. 19, entering waveguide 70 of the VMG shown in FIG. 18. The amplitude at any point along each pulse is sampled by means of a bias voltage whose zero crossings occur at intervals of $T/2$. A simple sine wave source 72 of period T, as illustrated on FIG. 20, provides the desired sampling periodicity.

Figure 21:
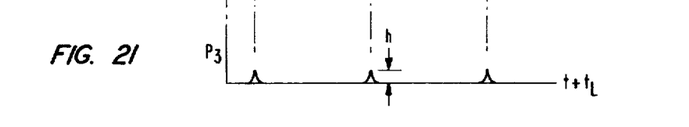

Each zero crossover of the bias signal couples a portion of the optical signal into guide 71 of the VMG. Designating the amplitude of the optical signal at the zero crossover point as h, the output $P_3$ from guide 71 is a sequence of subpicosecond pulses of amplitude h, as shown in FIG. 21. A slow speed optical detector 74 receives these pulses and generates an electrical signal proportional to h as indicated in measuring means 75. By shifting the phase of the bias voltage relative to that of the input optical signal by means of a phase shifter 73, the optical pulse can be sampled over its entire width and its shape ascertained. Inasmuch as the resolving power of the device is that of the gate width, very high resolution can be obtained with a VMG.

Pulse Generator

Figure 9:
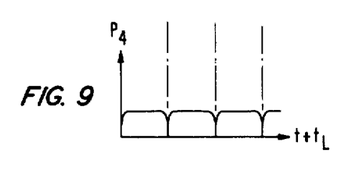
Figure 22:
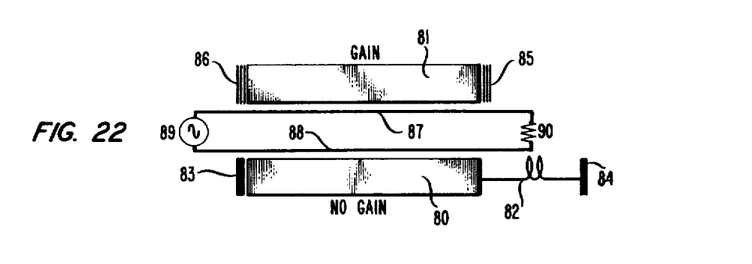
FIG. 22 shows a pulse generator in accordance with the invention.

It has been shown, hereinabove, that a velocity matched gate can generate a train of pulses from a continuous wave optical signal source. However, as shown in FIG. 9, most of the input optical wave is wasted. The embodiment now to be considered in connection with FIG. 22, is an oscillator in which all of the output optical power appears as a sequence of pulses. As illustrated, a pulse generator in accordance with this embodiment of the present invention comprises, as before, a pair of optical guides 80 and 81, and a bias voltage circuit including electrodes 87 and 88 terminated at one end by impedance 90 and energized at the other end by a bias signal source 89. In this embodiment, however, the coupling length is 2L, or twice the full transfer length. Therefore, at zero bias, all of the optical signal starting out at one end of either guide emerges from the same guide after having been fully transferred to the other guide. In addition, the upper guide 81 which is terminated with antireflective coatings 85 and 86, is built in a medium with gain. The lower guide 80, on the other hand, is built in a medium with no gain, has a fully reflecting mirror 83 at one end and an optical fiber 82 terminated with a highly reflective, partially transmissive mirror 84 at the other end. The fiber is included, as required, such that the time between successive zeros of the bias signal is equal to the time needed by a photon to travel from one mirror to the other and back. Using a sine wave bias source, the desired pulse repetition rate, R, determines the bias source period (i.e., $R = 2/T$). The length of fiber is then determined such that the round trip time of a photon travelling between mirrors 83 and 84 is equal to $T/2$.

In operation, consider photons from the background noise starting to travel from one end of guide 80, such as the end adjacent to mirror 83, at the instant the bias voltage is zero. These photons are fully transferred to guide 81 where, because of the gain, their number is increased. Inasmuch as the coupling length of the guides is 2L, the amplified signal is completely coupled back onto guide 80. The photons then propagate through the fiber 82, are reflected by mirror 84 and return to guide 80 propagating now in the reverse direction. This time, however, the bias voltage is not continuously zero and, hence, the reverse travelling photons remain in guide 80.

After traversing guide 80, the photons are reflected from mirror 83 and, once again in synchronism with a zero of the bias signal, repeat the trip through the gain medium and back. In fact, the trip is repeated many times during which the optical signal is amplified until the total round trip gain is equal to the total round trip loss.

All other photons derived from the background noise at times when the bias signal voltage is not approximately zero remain within guide 80 and, hence, are not amplified. The output from the partially transmissive mirror 84 is a train of narrow pulses spaced by half the period of the bias signal.

Figure 23:
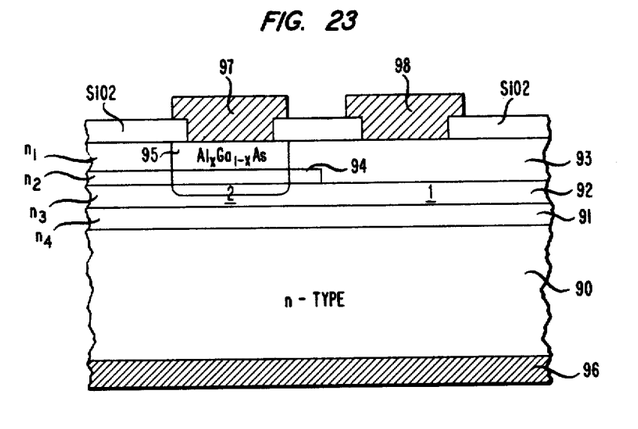
FIG. 23 shows an illustrative embodiment of an optical waveguide with gain.

FIG. 23 shows, in cross section, an arrangement for obtaining gain in one of the coupled waveguides as called for in the embodiment of FIG. 22. The illustrative embodiment comprises a first electrode 96 upon which there is disposed a GaAs substrate 90, a first layer of n-type AlGaAs 91, a second layer of AlGaAs 92 and a third layer of AlGaAs 93. The index of the various layers is increased or decreased by varying the fraction of aluminum (i.e., $Al_xGa_{(1-x)}As$) where the maximum index is obtained when $x=0$. In the embodiment of FIG. 23, the fraction of aluminum present in the various layers is such that the refractive index $n_3$ of layer 92 is greater than the indices $n_1$ and $n_4$ of layers 93 and 91, respectively. Simple guidance without gain is obtained in region 1 by virtue of the electrooptic effect produced by the electric field between electrode 96 and a second electrode 98 located adjacent to layer 93.

Gain in an adjacent region 2 of layer 92 is obtained by the inclusion of a thin GaAs layer 94 between layers 92 and 93 and an adjacent p-type region 95 of AlGaAs. Guidance and gain along region 2 is obtained by the application of an electric field between electrode 96 and a third electrode 97 located adjacent to p-region 95.

Figure 24:
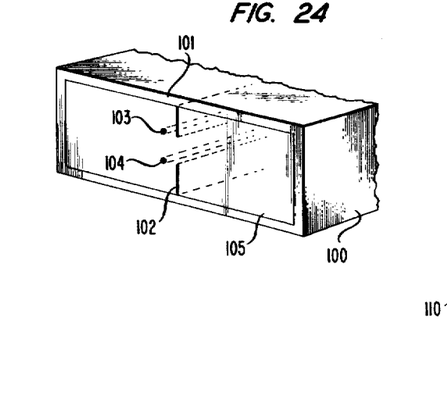
FIGS. 24, 25 and 26 show several arrangements for velocity matching the bias and optical wavepaths.
Figure 25:
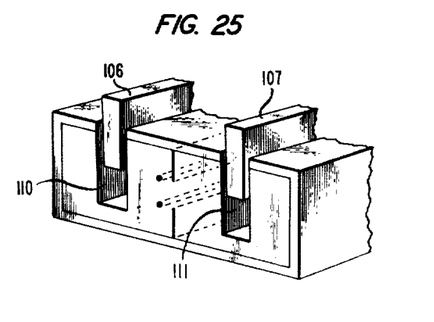
Figure 26:
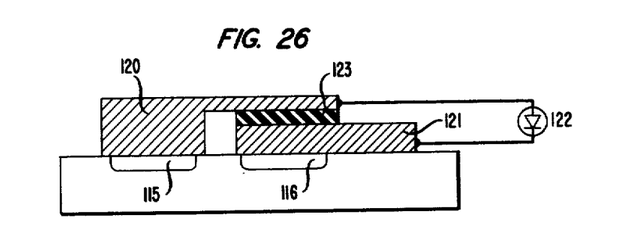

Crucial to the optimum operation of a velocity matched gate is, as the name implies, the matching of the speeds of the optical signal to that of the bias signal. Any mismatch tends to broaden the width of the pulses and to decrease their amplitude. FIGS. 24, 25 and 26 show three arrangements for matching the speed of the bias signal to that of the optical signal.

The first of the three embodiments, shown in FIG. 24, comprises a rectangular, metallic waveguide 100, at least partially filled with a dielectric material 105, and provided with a pair of metallic septa 101 and 102 that extend inward from the two broad walls of the waveguide.

Embedded within the dielectric material, adjacent to the septa in a region of high electric field, are a pair of coupled optical waveguides 103 and 104.

In operation, the phase velocity of the electrical biasing signal varies from a minimum value of $c/n_b$ at very high frequencies, where $n_b$ is the index of material 105, to a maximum value approaching infinity at the cut off frequency. Thus, by the appropriate selection of the bias wave frequency, the phase velocity of the bias wave can be matched to the group velocity of the optical wave.

Because the frequency of the bias signal determines the pulse repetition rate of the output optical pulses, the techniques for velocity matching described in connection with FIG. 24 may be inconsistent with the desired pulse rate of the optical signals. A preferred arrangement would permit matching and the independent selection of bias frequency. Two means of doing this are illustrated in FIGS. 25 and 26. The former embodiment is basically the same structure as FIG. 24 to which there has been added a pair of longitudinally extending slots 110 and 111 in which there is inserted a pair of metallic or dielectric slabs 106 and 107. At any bias wave frequency, the phase velocity of the wave can be changed by the degree of insertion of the slabs within the slots.

The embodiment of FIG. 26 is a modification of the embodiment of FIG. 1 wherein the dimensions and separation of the electrodes guiding the bias signal wave are appropriately selected to match the velocities of the two waves. In the illustrative embodiment, electrode 120 located above optical guide 115 extends over electrode 121 located above optical guide 116. The resulting capacitive load on the electrodes is a function of the amount of overlap and the thickness and refractive index of the layer of insulation 123 between the electrodes.

Closely spaced varactors, of which varactor 122 is illustrative, longitudinally distributed along the electrodes can be included as a means of electrically changing the capacitance per unit length of electrode, thus providing a means of fine tuning the phase velocity of the bias wave.

While the invention has been described with reference to optical signals, it will be recognized that the principles herein enunciated are applicable to other areas of the spectrum and, to all types of coupled circuits. For example, in a travelling wave tube, gain is obtained by the exchange of energy between an electron beam and a high frequency wave propagating along a helix. In accordance with the present invention, this gain can be modulated by the addition of a bias wave supporting circuit which decouples the beam from the helical wave except for selected short intervals, in the manner described hereinabove, to produce a sequence of narrow pulses. Other applications will readily suggest themselves to those skilled in the art.

I claim:

1. In combination:
   at least two coupled wave supporting means (11, 12) (60, 61) (70, 71) (80, 81) (103, 104) (115, 116);
   travelling wave means (14, 15) (65, 66) (87, 88) (100) (120, 121) for locally modulating the coupling between said wave supporting means in synchronism with the propagation of wave energy along said wave supporting means;
   and a first source of bias signal (17) (63) (72) (89) connected to said travelling wave means;
   CHARACTERIZED IN THAT
   the magnitude of said bias signal is sufficiently large so as to permit coupling between said wave supporting means solely in the zero crossing regions of said signal.

2. The combination according to claim 1 wherein:
   said coupled wave supporting means are optical waveguides (60, 61) (70, 71) having a coupling length L, and coupling coefficient c, where $cL \approx \pi/2$;
   and wherein said travelling wave means are a pair of metallic electrodes (14, 15) (65, 66) located adjacent to said optical waveguides.

3. The combination according to claim 1 wherein said bias signal is a sine wave whose amplitude is such that $$(4L\Delta n/\lambda) \gg 1,$$

where
   $\lambda$ is the wavelength of the optical wave energy; and
   $\Delta n$ is the maximum change in index induced along said optical waveguide by the bias signal.

4. The combination according to claim 3 including:
   a continuous wave source of optical wave energy $P_1$ coupled into one of said waveguides (11).

5. The combination according to claim 2 including:
   means (50) for frequency modulating said source of bias signal (17).

6. The combination according to claim 2 including:
   means (50) for amplitude modulating said source of bias signal (17).

7. The combination according to claim 2 including:
   means (50) for changing the slope of the bias signal in the region of its zero crossover points.

8. The combination according to claim 2 including:
   a first source of optical pulses $P_1$ occupying a first set of time slots coupled to one of said waveguides 11;
   a second source of optical pulses $P_2$ occupying a second set of time slots coupled to the other of said waveguides 12;
   wherein the zero crossover points of said bias signal coincide with one set of said time slots.

9. The combination according to claim 2 including:
   a third optical waveguide (62) in coupling relationship with the second of said other waveguides (61);
   a second travelling wave means, comprising a second pair of metallic electrodes (67, 68) for locally modulating the coefficient of coupling between said third waveguide (62) and said second waveguide (61) in synchronism with the propagation of wave energy along said waveguides;
   a second source of bias signal (64) connected to said second pair of metallic electrodes (67, 68);
   a first source of optical pulses $P_1$ occupying a first set of time slots coupled to one of said waveguides (60);
   a second source of optical pulses $P_2$ occupying a second set of time slots coupled to said second waveguide (61);
   a third source of optical pulses $P_3$ occupying a third set of time slots coupled to said third waveguide (62);
   wherein the zero crossover points of the bias signal from said first source of bias signal (63) coincide with said first set of time slots;
   and wherein the zero crossover points of the bias signal from said second source of bias signal (64) coincide with said third set of time slots.

10. The combination according to claim 2 including:
    a source of optical pulses $P_1$ of periodicity T/2 coupled to one of said wave supporting means (70);
    said bias signal source (72) has a period T;
    means (73) for varying the relative phase between said bias signal and said optical pulses;
    and means (74, 75) measuring a signal proportional to the amplitude of the output pulses $P_3$ from said other wave supporting means (71).

11. The combination according to claim 1 wherein:
    said coupled wave supporting means are optical waveguides (80, 81) having a coupling length 2L, and a coupling coefficient c, where $cL \approx \pi/2$;
    the first of said optical waveguides (80) being coupled to a length of wavepath (82) at one end;
    said wavepath (82) and said first optical waveguide (80) being terminated at their other ends by mirrors (84, 83), one of which is partially transmissive;
    the second of said optical wavepaths (81) being capable of amplifying optical wave energy propagating therein;
    and wherein the round trip travel time T between said mirrors (83, 84) is equal to half the period of said bias signal.

12. The combination according to claim 1 wherein:
    said travelling wave means is a rectangular metallic waveguide (100) at least partially filled with dielectric material (105) and including a pair of metallic septa (101, 102) extending inward from the two broad walls of the waveguide (100);
    and wherein said coupled wave supporting means are a pair of optical waveguides (103, 104) located adjacent to said septa.

13. The combination according to claim 12 including longitudinally extending slots (110, 111) in said waveguide (100) coextensive with said optical waveguides (103, 104);
    and a pair of slabs (106, 107), insertable within said slots (110, 111), for varying the velocity of propagation of wave energy within said waveguide (100).

14. The combination according to claim 1 wherein:
    said travelling wave means are a pair of overlapping, conductively insulated metallic electrodes (120, 121).

15. The combination according to claim 14 including a plurality of varactors (122) connected between said electrodes and longitudinally distributed therealong for controlling the capacitive loading along said electrodes.

* * * * *